US008567591B2

(12) United States Patent
González Alemany et al.

(10) Patent No.: US 8,567,591 B2
(45) Date of Patent: Oct. 29, 2013

(54) LONGITUDINAL JOINT

(75) Inventors: Miguel Ángel González Alemany, Oviedo (ES); Mónica Díaz Sorribas, Gijó (ES); Alberto Pello Garcia, Piedras Blancas (ES); Juan Domingo González Pantiga, Gijón (ES)

(73) Assignee: Thyssenkrupp Elevator Innovation Center, S.A., Gijon, Asturias (ES)

( * ) Notice: Subject to any disclaimer, the term of this patent is extended or adjusted under 35 U.S.C. 154(b) by 0 days.

(21) Appl. No.: 13/550,151

(22) Filed: Jul. 16, 2012

(65) Prior Publication Data

US 2013/0022389 A1 Jan. 24, 2013

(30) Foreign Application Priority Data

Jul. 20, 2011 (ES) .................................. 201131237

(51) Int. Cl.
*B65G 47/66* (2006.01)

(52) U.S. Cl.
USPC .......................................... 198/600; 198/324

(58) Field of Classification Search
USPC .......................................... 198/600, 324, 325
See application file for complete search history.

(56) References Cited

U.S. PATENT DOCUMENTS

| | | | | |
|---|---|---|---|---|
| 1,707,287 | A | 4/1929 | Sudzki | |
| 2,173,900 | A | 9/1939 | Dunn | |
| 2,624,444 | A * | 1/1953 | Casabona | 198/560 |
| 2,958,083 | A | 11/1960 | Shook et al. | |
| 4,037,714 | A * | 7/1977 | Koepke | 198/774.3 |
| 4,341,253 | A | 7/1982 | Eyerle | |
| 5,605,222 | A * | 2/1997 | Huberty et al. | 198/841 |
| 5,971,129 | A * | 10/1999 | Stawniak et al. | 198/325 |
| 6,068,107 | A * | 5/2000 | Brun-Jarret | 198/600 |
| 6,164,435 | A * | 12/2000 | Coen et al. | 198/600 |
| 7,308,979 | B1 * | 12/2007 | Layne et al. | 198/600 |
| 7,992,703 | B2 * | 8/2011 | Underberg et al. | 198/600 |
| 8,210,341 | B2 * | 7/2012 | Marshall et al. | 198/600 |

FOREIGN PATENT DOCUMENTS

| | | |
|---|---|---|
| JP | 8-188365 | 7/1996 |
| WO | WO 97/08408 | 3/1997 |

* cited by examiner

*Primary Examiner* — James R Bidwell
(74) *Attorney, Agent, or Firm* — Merchant & Gould P.C.

(57) ABSTRACT

A longitudinal joint forms a surface usable as a passage between first and second passage surfaces (2,3) adjacent to one another, usable as walking user passage, the distance between both in the longitudinal direction being variable. The longitudinal joint (1) has transverse slats (4) attached to one another, with a substantially planar upper surface (5), each being attached to the contiguous slats by a pivot point (6) with respect to which they can rotate preserving the continuity of the surface of the longitudinal joint (1). The slats (4) rest on a series of support surfaces (8,9,12), a certain number of slats being hidden under the first passage surface (2), below the level of the upper surface (5), by the relative rotation to one another with respect to the pivot point (6), depending on the distance between first and second passage surfaces (2,3).

6 Claims, 5 Drawing Sheets

LONGITUDINAL JOINT

This application claims benefit of Serial No. 201131237, filed 20 Jul. 2011 in Spain and which application is incorporated herein by reference. To the extent appropriate, a claim of priority is made to the above disclosed application.

TECHNICAL FIELD OF THE INVENTION

The present invention relates to longitudinal joints for forming surfaces the purpose of which is to allow varying the distance between two fixed adjacent passage surfaces, maintaining the continuity between both and allowing use as a treadable surface by users. The variation of the distance between the two adjacent passage surfaces allowed by the longitudinal joint is short, and it will be due to certain reasons such as temperature and operating variations, manufacturing or assembly tolerances, or elongation of components relating to the adjacent passage surfaces due to use.

BACKGROUND OF THE INVENTION

There are many inventions which attempt to technically solve the need for having movable surfaces applied to various fields of the art. Some of these inventions are based on the blind concept such that they use a series of slats or elements attached to one another arranged according to a mainly planar surface but which can be wound around a drum such that by means of the rotation of the drum said slats take up a circumferential position around it, the length of the horizontal surface being modified.

An example of application can be seen in U.S. Pat. No. 2,958,083A, where this concept is used for covering a swimming pool. Other patents such as WO9708408A try to solve the mechanism which allows covering or removing covers using this concept or covers of other types.

U.S. Pat. No. 4,341,253A uses an equivalent system for covering a vehicle service pit, and U.S. Pat. No. 1,707,287A uses a similar concept for forming a vertical door serving as protection against fire. U.S. Pat. No. 2,173,900A applies a cover formed by slats for protecting an escalator, said cover not forming part of the machine itself.

There are also inventions describing different solutions for opening walkway and escalator pit covers. For example, patent JP8188365A describes various solutions of systems for opening maintenance pit covers for reducing the effort needed.

In summary, it can be said that there are inventions describing systems for opening pit covers in escalators and also various cover systems by means of blind slats as well as mechanisms for actuating them.

The present invention seeks to apply the blind concept to form a longitudinal joint between two fixed pit covers the relative distance of which will vary due to different reasons and without applying any manually or mechanically operated mechanism and forming a treadable continuous surface for the users of escalators or moving walkways.

In some escalator or moving walkway inventions, a fixed relative position between the overturn position of the steps or pallets and the combs is used, whether it is through the traditional step or pallet chain or when in its place the steps or pallets themselves are attached to one another forming a continuous band. When this occurs in the upper head no special action is required, but given that said step or pallet chain or the band formed by them requires being tensed, its position is modified with respect to the fixed part, therefore if the position of the combs is maintained with respect to the band of steps or pallets it is necessary to have a surface which allows varying the length between said adjacent surfaces.

DESCRIPTION OF THE INVENTION

The present invention solves the problems existing in the state of the art by means of a longitudinal joint of the type forming a surface usable as a passage between a first passage surface and a second passage surface adjacent to one another, and usable as walking user passage, the distance between the first surface and the second surface in the longitudinal direction being variable. Said surface must have the same consistency as the adjacent passage surfaces and serve as support for user passage.

The longitudinal joint has a plurality of transverse slats which are attached to one another forming a substantially planar upper surface. Each of the transverse slats of the longitudinal joint is attached to the contiguous transverse slats by a pivot point with respect to which said transverse slats can rotate, maintaining the continuity of the surface of the longitudinal joint.

The longitudinal joint additionally has intermediate surfaces configured for supporting the transverse slats, these intermediate surfaces being attached to the adjacent passage surfaces.

In other words, more specifically, the longitudinal joint additionally comprises a first intermediate surface which is attached to the first passage surface, and a second intermediate surface which is attached to the second passage surface, configured for supporting the transverse slats (4). At least part of the second intermediate surface rests on the first intermediate surface, the support area between both surfaces being variable depending on the distance between the first passage surface and the second passage surface.

The transverse slats can preferably rest on first support surfaces supported on the first intermediate surface, and on second support surfaces supported on the second intermediate surface, the first support surfaces and the second support surfaces preferably being transversely alternated.

Additionally, the transverse slats additionally rest on curved support surfaces which are attached directly to the first passage surface, and said first passage surface has an inclined lower surface at its end such that a certain number of transverse slats are hidden under this first passage surface, below the level of the upper surface of the longitudinal joint, by means of the relative rotation of the slats to one another with respect to the pivot point, depending on the distance existing between said first passage surface and the second passage surface. Therefore, when the distance between adjacent passage surfaces is the maximum considered in the design thereof, there will be a small number of slats hidden under the first passage surface, while when said distance is minimum there will be a greater number of slats hidden under the first passage surface and therefore a smaller number of visible slats.

The inclined lower surface of the first passage surface particularly rests on the transverse slats which are hidden under it by means of at least one additional support element, giving greater consistency to the transition between the passage surfaces.

All the surfaces and supports have sufficient structural consistency and resistance and suitable non-slip properties for allowing users to pass on them.

Furthermore, it is suitable that both the slats and the support surfaces on which the slats are supported are made of a material the properties of which allow friction which occurs when the distance between the adjacent passage surfaces varies without deteriorating.

The transverse slats of the longitudinal joint object of the invention preferably have a protective element at each of their ends protecting said transverse slats and the fixed structure in which this longitudinal joint is arranged from friction. Thus, if the slats are located transversely between fixed surfaces with respect to which the slats have relative movement, or during the operations of placing and removing them, both the slats and the fixed structure will be protected from friction.

Additionally, according to a particular embodiment, the present invention has tensing means connected to the transverse slats which are hidden under the first passage surface. These tensing means, either by means of placing weights, a spring or other similar means, make the tension help to assure stability and movements of the slats are thereby prevented, whether such movements of the slats are transverse to one another, longitudinal movements which modify the amount of usable surface in the cover when there is no variation of the distance between the adjacent passage surfaces, or vertical movements which can generate noises when being used by users.

One of the preferred applications for which the present invention can be used is to serve as a treadable surface for users of escalators and moving walkways, in which the position of the comb plate experiences a relative movement with respect to the fixed pit cover, due for example to it using a system of combs in which the position between the overturn of the steps or pallets and said combs must be fixed and where the step or pallet chain or the band formed by them requires being tensed.

DESCRIPTION OF THE DRAWINGS

For the purpose of aiding to better understand the invention, an embodiment of the invention making reference to a series of drawings will be described below in an illustrative but non-limiting manner.

Figure 1:
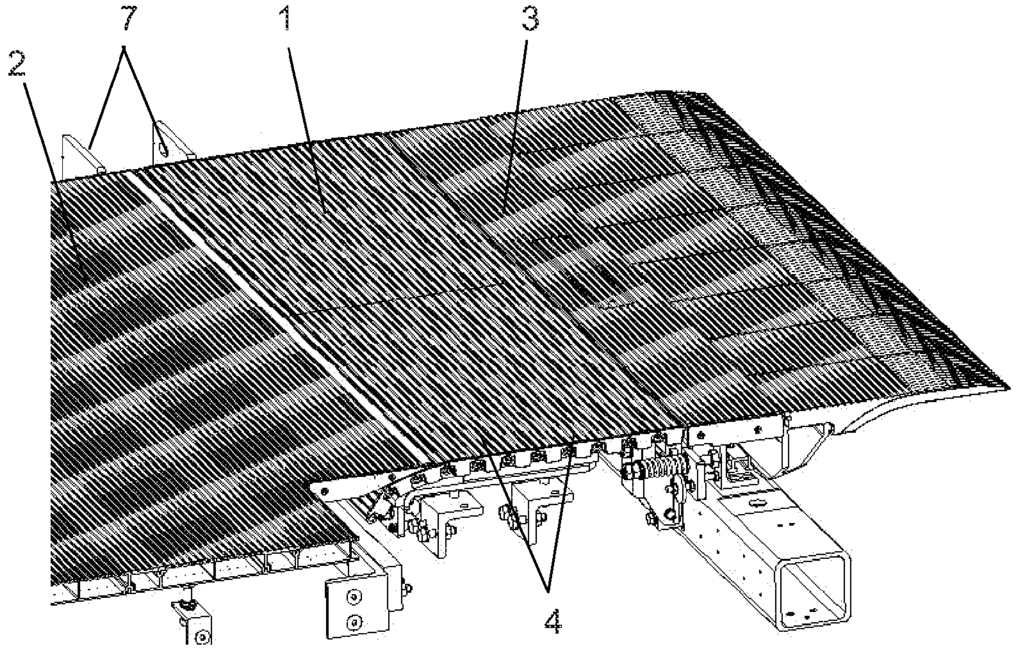
FIG. 1 shows a top isometric view of a complete usable surface assembly formed by two adjacent passage surfaces the relative distance of which is modified, the surface forming the longitudinal joint and its support surfaces.
Figure 2:
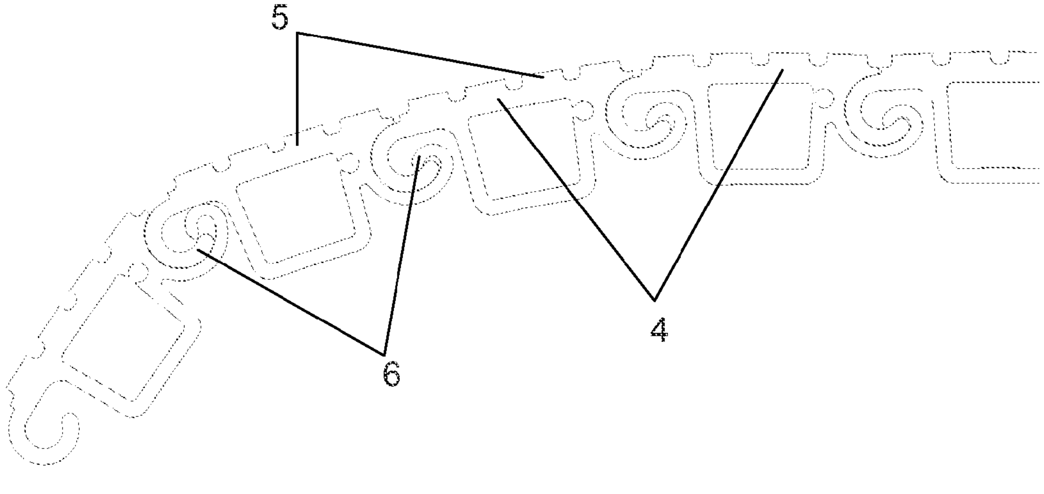
FIG. 2 shows a cross-section side view of a set of transverse slats attached to one another.

The following set of elements is referred to in these drawings:

1. longitudinal joint
2. first user passage surface
3. second user passage surface
4. transverse slats of the longitudinal joint
5. upper surface of the longitudinal joint
6. pivot point
7. fixed structure
8. curved support surfaces
9. first support surfaces
10. first intermediate surface
11. protective element for protecting the ends of the transverse slats
12. second support surfaces
13. second intermediate surface
14. first fastenings
15. second fastenings
16. inclined lower surface
17. additional support element
18. tensing means springs
19. tensing means weights

DESCRIPTION OF PREFERRED EMBODIMENTS OF THE INVENTION

The object of the present invention is a longitudinal joint of the type forming a surface usable as a passage between a first passage surface 2 and a second passage surface 3, which are adjacent to one another, and they are used as walking user passage, the distance between both surfaces 2,3 in the longitudinal direction being variable.

As can be observed in the figures, the longitudinal joint 1 is formed by a plurality of transverse slats 4 attached to one another which have a geometry such that they form a substantially planar upper surface 5. Each of the transverse slats 4 is attached to the transverse slats 4 contiguous to it by a pivot point 6 with respect to which said transverse slats 4 can rotate and preserve the continuity of the surface of the longitudinal joint.

The longitudinal joint additionally has a first intermediate surface 10 integrally attached to the first passage surface 2 by means of fastenings 14, and a second intermediate surface 13 integrally attached to the second passage surface 3 by means of fastenings 15, configured for supporting the transverse slats 4.

Figure 7:
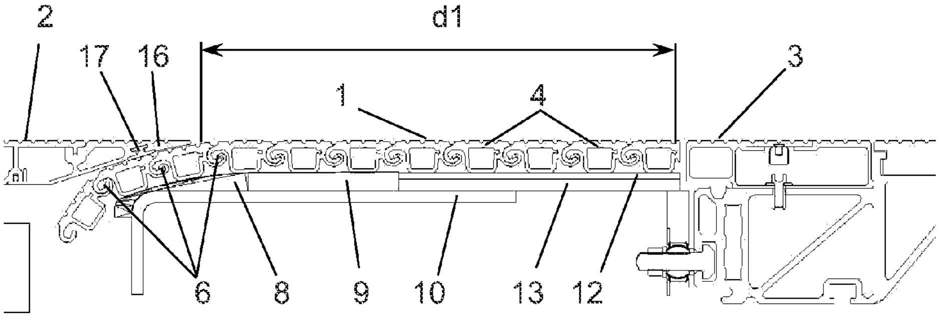
FIG. 7 shows a side cross-section view of the usable surface formed by two adjacent passage surfaces the relative distance of which is modified, the surface forming the longitudinal joint and some passage surfaces for both adjacent passage surfaces when the distance between said surfaces is maximum.
Figure 8:
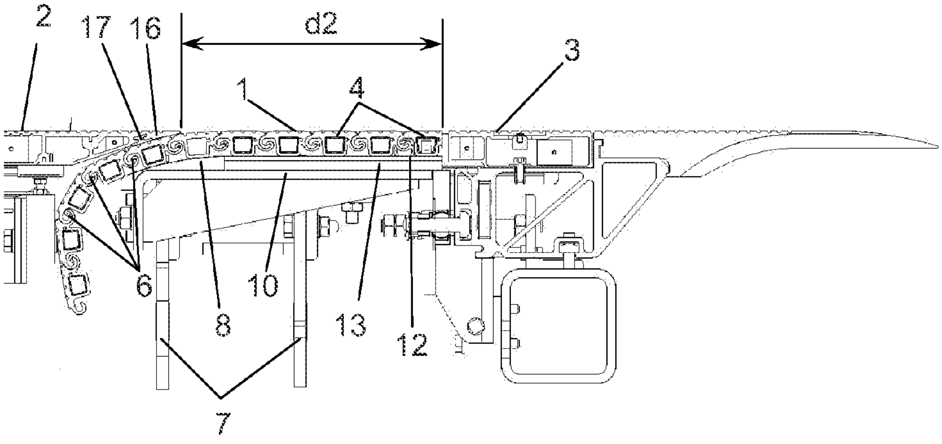
FIG. 8 shows a side cross-section view of the usable surface formed by two adjacent passage surfaces the relative distance of which is modified, the surface forming the longitudinal joint and the support surfaces for both adjacent passage surfaces when the distance between said surfaces is minimum.
Figure 9:
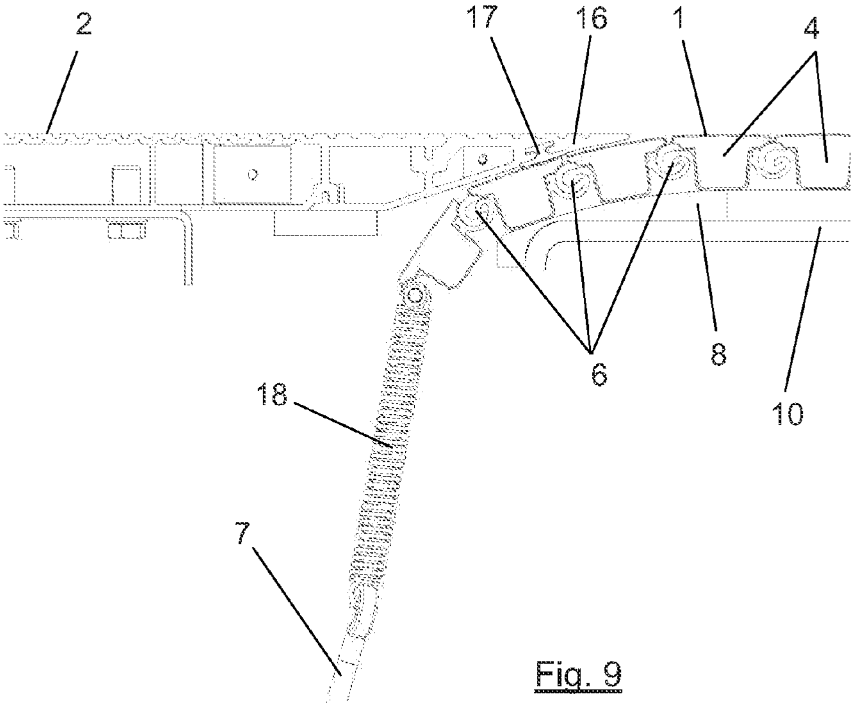
FIG. 9 shows a side view of the tensing system for tensing the slats by means of using a spring.
Figure 10:
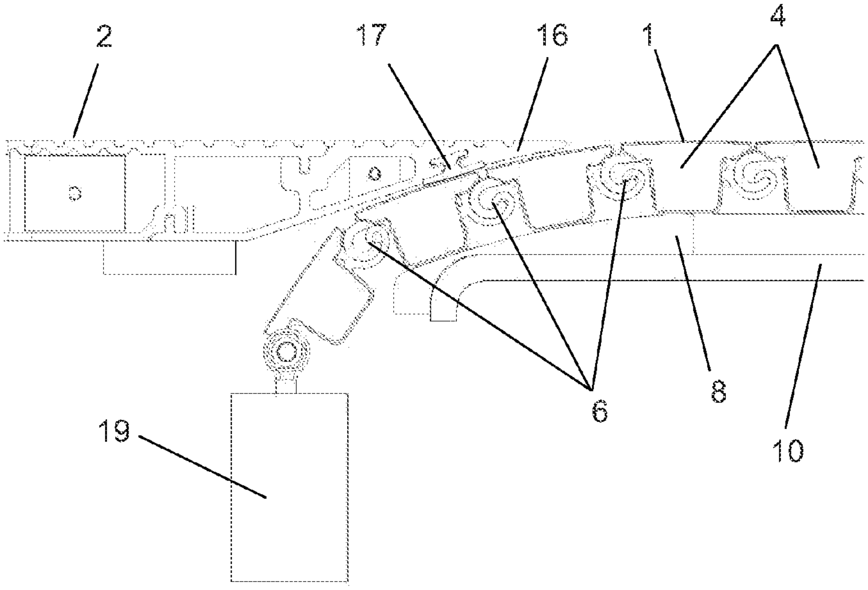
FIG. 10 shows a side view of the tensing system for tensing the slats by means of using a weight.

As can be seen in the figures, specifically in FIGS. 7 and 8, at least part of the second intermediate surface 13 rests on the first intermediate surface 10, the support area between both surfaces 13,10 being variable depending on the distance existing between the first passage surface 2 and the second passage surface 3.

When the distance between both adjacent support surfaces 2,3 is maximum d1, the support between both intermediate surfaces 13,10 will be minimum, while when said distance is minimum d2, the support surface between the surfaces 13,10 will be maximum.

Figure 5:
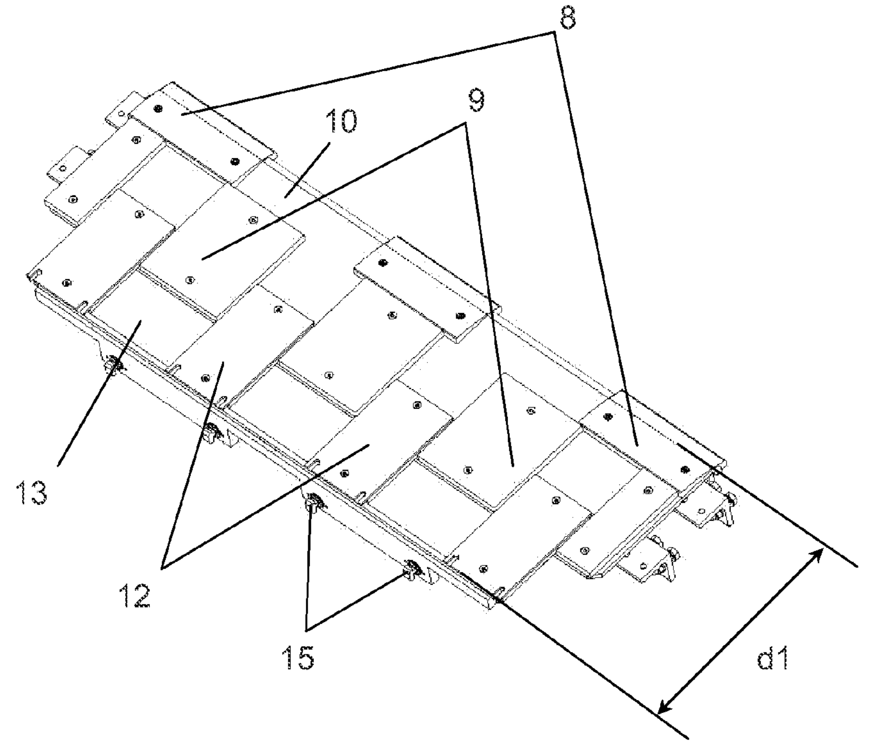
FIG. 5 shows a top isometric view of the support surfaces of the slats in the position in which the distance between the adjacent passage surfaces is maximum.
Figure 6:
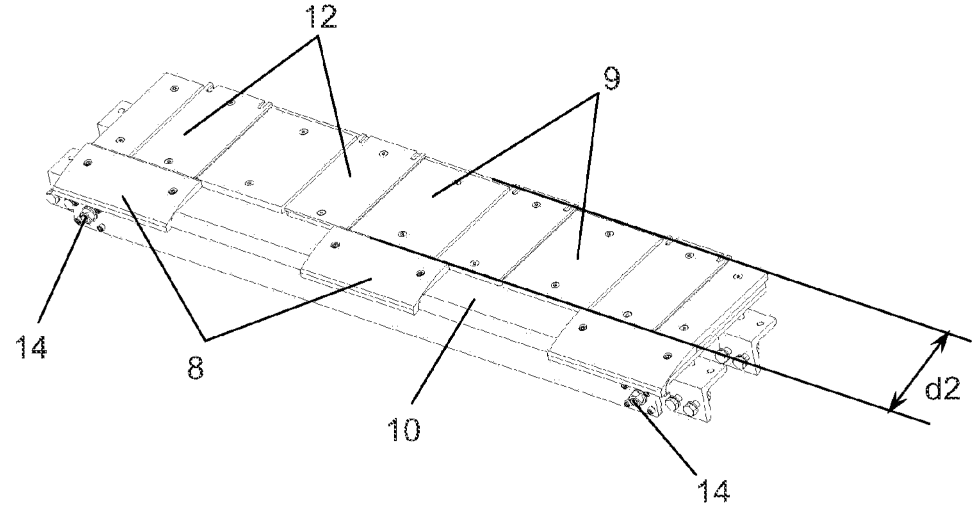
FIG. 6 shows a top isometric view of the support surfaces of the slats in the position in which the distance between the adjacent passage surfaces is minimum.

According to a preferred embodiment of the invention shown in FIGS. 4 to 8, the transverse slats 4 rest on first support surfaces 9, which are supported on the first intermediate surface 10 and on second support surfaces 12, which are supported on the second intermediate surface 13. Furthermore, as shown in FIGS. 5 and 6, the first support surfaces 9 and the second support surfaces 12 are preferably transversely alternated.

Additionally, the transverse slats 4 rest on curved support surfaces 8 which are attached directly to the first passage surface 2.

The material of the support surfaces 8,9,12 allows friction which occurs with respect to the lower surface of the slats 4 when the distance between the adjacent support surfaces 2,3 varies without deteriorating.

FIGS. 7 to 10 show that the first passage surface 2 has an inclined lower surface 16 at its end such that a certain number of transverse slats 4 are hidden under said first passage surface 2, below the level of the upper surface 5 of the longitudinal joint 1, this being achieved by means of the relative rotation of the slats 4 to one another with respect to the pivot point 6, depending on the distance existing between the first passage surface 2 and the second passage surface 3.

Therefore, when the distance between the adjacent passage surfaces 2,3 is the maximum considered distance d1, there will be a certain number of slats 4 hidden under the first support surface 2, while when said distance is the minimum considered distance d2, there will be a greater number of slats 4 hidden under the first support surface 2, and therefore a smaller number of slats 4 forming the usable surface of the longitudinal joint 1.

The inclined lower surface 16 of the first passage surface 2 preferably rests on the transverse slats 4 which are hidden under it by means of at least one additional support element 17, as seen in the figures, giving greater consistency to the transition between adjacent support surfaces 2,3.

Figure 3:
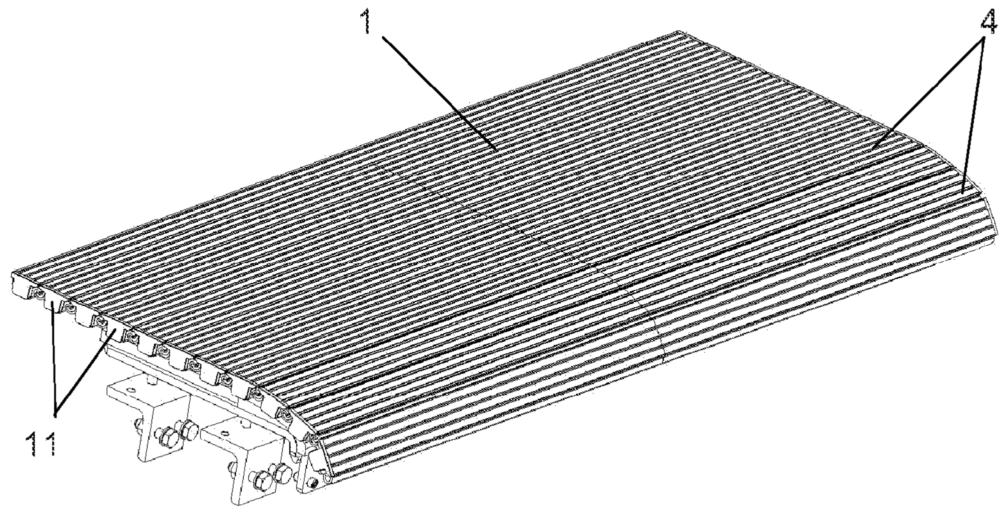
FIG. 3 shows a top isometric view of the surface of the longitudinal joint formed by the transverse slats and its supports.
Figure 4:
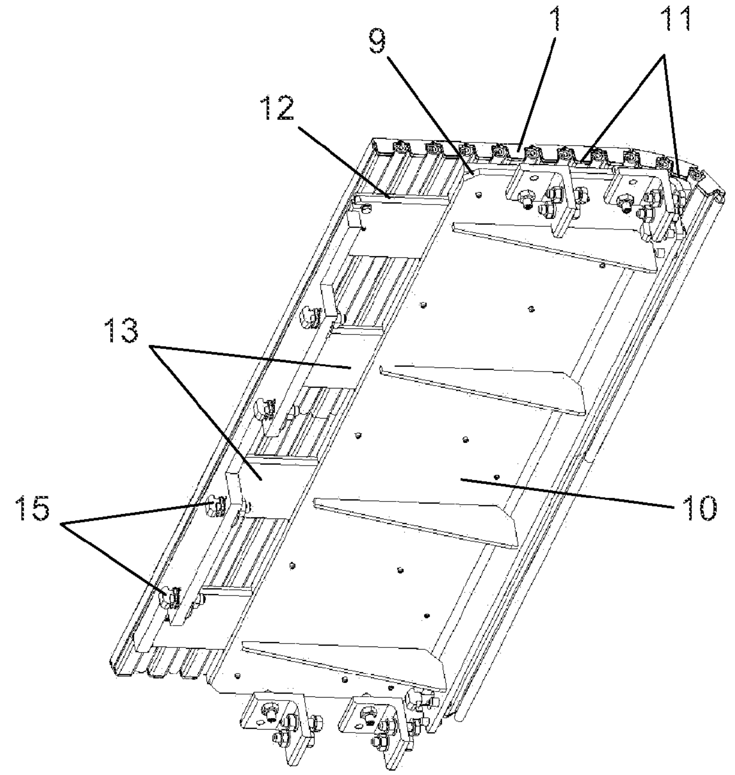
FIG. 4 shows a bottom isometric view of the surface of the longitudinal joint formed by the transverse slats and its supports.

According to a preferred embodiment of the invention, the transverse slats 4 comprise a cap or protective element 11 at each of their ends protecting said transverse slats 4 and the fixed structure 7 in which the longitudinal joint 1 is arranged from friction. This protective element 11 can be seen in FIGS. 3 and 4.

According to a particular embodiment of the longitudinal joint, it has tensing means 18,19 connected to the transverse slats 4 which are hidden under the first passage surface 2.

The slats 4 which are hidden vertically below the first support surface 2 can preferably have a tensing system by means of placing one or several springs 18, one or several weights 19 or other similar systems, such that said tension helps to assure stability, and movements of the slats 4 are thereby prevented, whether such movements are transverse, longitudinal, or vertical movements.

Having clearly described the invention, it is hereby stated that the particular embodiments described above can be modified in detail provided that the fundamental principle and the essence of the invention are not altered.

The invention claimed is:

1. A longitudinal joint forming a longitudinal joint surface usable as a passage between a first passage surface and a second passage surface adjacent to one another, and usable as a walking user passage, the distance between the first passage surface and the second passage surface in the longitudinal direction being variable, said longitudinal joint comprising:

a plurality of transverse slats attached to one another, having a substantially planar upper surface, each of said transverse slats being attached to contiguous transverse slats by a pivot point with respect to which said transverse slats can rotate, maintaining continuity of the longitudinal joint surface;

a first intermediate surface attached to the first passage surface, and a second intermediate surface attached to the second passage surface, configured for supporting the transverse slats, at least part of the second intermediate surface resting on the first intermediate surface, a support area between the first intermediate surface and the second intermediate surface being variable depending on the distance between the first passage surface and the second passage surface;

curved support surfaces attached directly to the first passage surface, wherein the transverse slats further rest on the curved support surfaces; and wherein the first passage surface comprises an inclined lower surface at an end, a plurality of the transverse slats being hidden under said first passage surface, below a level of the upper surface of the longitudinal joint, by the relative rotation of the slats to one another with respect to the pivot point, depending on the distance between the first passage surface and the second passage surface.

2. The longitudinal joint according to claim 1, wherein the transverse slats rest on first support surfaces supported on the first intermediate surface, and on second support surfaces supported on the second intermediate surface.

3. The longitudinal joint according to claim 2, wherein the first support surfaces and the second support surfaces are transversely alternated.

4. The longitudinal joint according to claim 1, wherein the inclined lower surface of the first passage surface rests on the transverse slats hidden under the first passage surface by at least one additional support element.

5. The longitudinal joint according to claim 1, wherein the transverse slats comprise a protective element at each of their ends protecting said transverse slats and a fixed structure in which the longitudinal joint is arranged from friction.

6. The longitudinal joint according to claim 1, further comprising a tensioner connected to the transverse slats hidden under the first passage surface.

* * * * *